United States Patent
Iakobashvili et al.

(10) Patent No.: US 8,341,520 B2
(45) Date of Patent: Dec. 25, 2012

(54) METHOD AND SYSTEM FOR SPELL CHECKING

(75) Inventors: Robert Iakobashvili, Ashdod (IL); Ofer Chermesh, Even-Yehuda (IL)

(73) Assignee: Ghotit Ltd., Even Yehuda (IL)

( * ) Notice: Subject to any disclaimer, the term of this patent is extended or adjusted under 35 U.S.C. 154(b) by 311 days.

(21) Appl. No.: 12/663,849

(22) PCT Filed: Sep. 16, 2008

(86) PCT No.: PCT/IL2008/001226
§ 371 (c)(1),
(2), (4) Date: Dec. 10, 2009

(87) PCT Pub. No.: WO2009/040790
PCT Pub. Date: Apr. 2, 2009

(65) Prior Publication Data
US 2010/0180198 A1 Jul. 15, 2010

Related U.S. Application Data

(60) Provisional application No. 60/960,259, filed on Sep. 24, 2007.

(51) Int. Cl.
*G06F 17/00* (2006.01)

(52) U.S. Cl. ...................... 715/257; 715/259
(58) Field of Classification Search ............... 715/257, 715/200, 260, 259
See application file for complete search history.

(56) References Cited

U.S. PATENT DOCUMENTS

| | | | |
|---|---|---|---|
| 6,272,456 B1* | 8/2001 | de Campos | 704/8 |
| 2005/0278292 A1* | 12/2005 | Ohi et al. | 707/1 |
| 2007/0240043 A1* | 10/2007 | Fux et al. | 715/533 |
| 2007/0240044 A1* | 10/2007 | Fux et al. | 715/533 |
| 2007/0240045 A1* | 10/2007 | Fux et al. | 715/533 |
| 2007/0276653 A1* | 11/2007 | Greenwald et al. | 704/10 |

* cited by examiner

*Primary Examiner* — Manglesh M Patel
(74) *Attorney, Agent, or Firm* — Vladimir Sherman; Professional Patent Solutions

(57) ABSTRACT

The present invention provides a method of correction of misspelled and confused words in a phrase written in a natural language, as well as a computer system employing this method. The method of the invention comprises creating a fast-lookup N-gram database for context spelling combined with editing and phonetic rules, POS and grammar bindings. Employed in the computing system the method permits to achieve fast and efficient spelling correction with a high correction success level for most difficult texts. The method of the invention does not require any pre-training or pre-learning user-specific patterns of errors.

16 Claims, 2 Drawing Sheets

METHOD AND SYSTEM FOR SPELL CHECKING

TECHNICAL FIELD OF THE INVENTION

The present invention relates to assistance in text processing, editing documents or any other written content, including web-content, and more specifically to spell checking.

ABBREVIATIONS

OCR—optical character recognition
POS—part(s) of speech
WWW—world-wide web, Internet

DEFINITIONS

Phrase is a string of two or more logically connected written words being a sentence, or a part thereof;
Misspelled word is a word not belonging to a dictionary of the particular natural language, or user's personal dictionary;
Confused word (also, misused or out-of-context word) is a word belonging to a dictionary of a natural language, or user's personal dictionary, but used incorrectly with regards to the context of the phrase.
Correction alternative is a word considered for replacing the misspelled or confused word;
Set of correction alternatives is a set of words each of which being a correction alternative.
Correction candidate is a word belonging to a set of correction alternatives which is selected from the set according to certain criteria. In the present invention the correction candidate is usually displayed to the user for user-interactive spelling correction, or automatically replaces misspelled or confused words.
Correct N-gram is an N-gram, comprising only correctly spelled words of a natural language and allowed by POS and grammar binding of the language;
Sufficiently large set of documents is a set of text documents sufficiently large for generation of N-gram database, covering at least 95% of correct N-grams within the texts to be corrected. Non-limiting example of such set is a set of WWW-located documents.
Word-in-question is a misspelled, confused or suspected confused word;
Target language is a natural language of the texts to be checked and corrected,
Foreign language is any other language, such as natural language other than target language, computer programming language, etc.

REFERENCES

1. J. Pedler, Computer Correction of Real-Word Spelling Errors in Dyslectic Text, Ph.D. Theses, Birckbeck; London University, 2007 $http://www.dcs.bbk.ac.uk/researchlrecentphds/pedler.pdf
2. A.R Golding & D. Roth, A Winnow-Based Approach to Context-Sensitive Spelling Correction, Machine Learning, 34 (1-3), 1999: 107-130 $http://www.springerlink.com/content/u13k0333 01184r82/
3. $http://www.alphaworks.ibm.comltechlcsspell
4. $http://www.merl.com/proiects/spelling1
5. V. I. Levenshtein, Binary codes capable of correcting deletions, insertions, and reversals. Soviet Physics Doklady 10, 1966 :707-710
6. L. Philips, The Double Metaphone Search Algorithm, C/C++Users Journal, June 2000, $http://www.ddj.com1cW/184401251.

BACKGROUND ART

Computer word processing, using computer programs commonly called text editors or word processors, is a part of most people daily lives. Many people are writing in multiple computer programs, such as e-mails, instant messengers, chats, etc. People are commonly making writing mistakes, which can be pure technical mistakes, like typing a wrong letter, or mistakes originating from poor language knowledge, or deficient literacy or learning disabilities like dyslexia.

Spelling correction, either automatic or explicitly requested by user, is a common event in word processing. Spellers (spelling software programs or program components, servers, hardware devices, etc) are either correcting the misspelled words or suggesting one or several correction candidates by testing each written words against a dictionary of the known words. If a speller finds a written word, which is not in the dictionary, it tries to suggest candidate words taken from the dictionary, which are "closest" to the written word and normally differ from it in 1-2 letters. Most advanced spellers are suggesting as candidates also words, which are very different from the misspelled words, but are pronounced very similarly, performing also so-called phonetic spell checking.

Conventional spellers fail to correct or propose the right correction, when a written word contains several mistakes, which make it too "distant" or "un-recognizable" from any word in the dictionary. This is what happens, when conventional spellers attempt to work on texts written by dyslectics, for example. Yet another problem is, when a word is spelled correctly, but the word is wrong regarding the context of the specific sentence, being a confused word. Phonetic spellers are also not helpful and not detecting those confused words, which are "homophones" (the words pronounced similarly, however have completely different meanings). For example, in the sentence "I would like to meat a friend" appears the word "meat" instead of "meet", conventional spellers and spelling techniques will not recognize the "homophone" problem and will not fix it or propose any corrections.

Lots of commercial text-processing tools, editors and word processors have been examined and reviewed in details in a recently [1], where all the tools were found not of much assistance to correct severe spelling errors, e.g. of the kids and adults with dyslexia. This review does not cover rather recent Microsoft Office 2007, claiming "contextual spelling" capabilities. Since there are no yet published data exploring the facility, we have examined the MS-Word-2007with context spelling ourselves, using sentences mostly from the public sources [1]. MS-Word-2007speller corrects about 50% of the errors, whereas the invented by us approach brings the correction level to 90% as can be seen at $www.ghotit.com embedded speller, when following the web-site's spelling instructions. There is no any information published yet about the techniques used by Microsoft in MS-Office 2007contextual spelling.

In order to provide a real solution to the above problems a combination of spellers with the context meaning of the text, which is commonly known as context sensitive spelling or context spelling [2], is required. Classical prior art like U.S. Pat. No. 5,956,739 or references [2] and [3] are suggesting context-spelling approaches that require prior or in-time training of the spellers on a so-called text corpus, which is a large and structured set of documents on the topics used by the writer. Such corpus is commonly used by context-sensitive spellers to generate an index of words, which are commonly used within the same context. The technology fails on rather short texts or a text with a novel subject, which is not a part of the corpus documents, used to train the speller; the technology also requires huge processing time and consumes a lot of computing resources like memory and CPU.

People of different ages and different professions and hobbies are writing texts of different subjects and contexts, using different words and even slang. Even a very huge corpus cannot combine all spectra of human life and be dynamic enough to cover all types of contexts. WWW contains all varieties of texts, represents all types of subjects, slang and is constantly updated.

U.S. Pat. Nos. 6,401,084, 7,050,992, 7,194,684, 7,254,774, US Patent Applications 2005/0257146, 2006/0161520 and 2007/0106937 are describing usage of user search query logs for spelling correction of the queries and even for word-processing documents. In many cases the logs number of occurrences can help to propose candidate words for correction and to provide a certain context for spelling. The deficiency of the prior art is that user queries are mainly limited to only two-three words, which may be in many cases insufficient to provide a context depth for a regular sentence and does not enable the adoption of the powerful context spelling approaches like N-grams, usage of grammar binding and POS-tagging.

U.S. Pat. Nos. 6,618,697, 6,349,282 and many others are teaching usage of N-grams for spelling corrections. The techniques may be successful for speech recognition or OSR, but are failing at heavy dyslectic texts, where each word of a phrase may be misspelled or confused, comprising from actually only illegal N-grams. Such techniques of N-grams usage are potentially pushing out the correct, but statistically less commonly used words and phrases, and making spelling correction in many cases less successful, than the corrections of conventional spell checkers. Yet other deficiencies of many other techniques involving N-grams are usage of a not large enough N-grams database, which seriously deteriorates quality of text correction.

Prior art like DE 102005026352 and US Patent Application 2002/0194229 describes usage of Internet for a word spelling correction by generating a number of possible candidates for a misspelled word, making Internet search by a search engine for the word and its candidates, and taking the candidates with maximum Internet occurrences as the best candidates for spelling correction. The art also describes usage of a network database to store the results and their caching with timely updates. The art also does not teach any context aware spell checking by using N-grams database, usage of grammar binding and POS-tagging as well as usage of the methods in combination with editing and phonetic distances.

Other prior art, described in WO 2007/094684, presents usage of context sensitive spell checking for Optical Character Recognition (OCR) process for confirming uncertainly recognized words by searching the words correction alternatives in combination with one or more previous and subsequent words as the queries to an Internet search engine. The word candidates with the top occurrences of the text strings in Internet are the best candidates to be used. The art also does not teach any context aware spell checking by using N-grams database, usage of grammar binding and POS-tagging as well as usage of the methods in combination with editing and phonetic distances.

The art describes performing a look-up against an Internet search engine from a client directly and as a near real-time process without any caching of results, database or in-memory database involved. Such a process may be acceptable for OCR, where uncertainly recognized words are rather rare, whereas usage of such approach for word-processing spelling with a large number of possible mistakes and high number of potential candidate words to consider is practically not possible due to the following factors:

Search engine abusing;
Heavy network load;
High response time, where the near instant spelling correction is required.

SUMMARY OF INVENTION

The present invention provides a method of correction of misspelled and confused words in a phrase written in a natural language, as well as a computer system employing this method. The method of the invention comprises creating a fast-lookup N-gram database for context spelling combined with editing and phonetic rules, POS and grammar bindings. Employed in the computing system the method permits to achieve fast and efficient spelling correction with a high correction success level for most difficult texts. The method of the invention does not require any pre-training or pre-learning user-specific patterns of errors.

DISCLOSURE OF INVENTION

The present invention provides a method of correction of misspelled and confused words in a phrase written in a natural language. The invention also provides a system employing this method.

In a first preferred embodiment of the invention said method comprises the following steps:
(a) creating a database of N-grams in which each record contains two fields: N-gram and its occurrence frequency, said database being created using sufficiently large set of documents written in said natural language;
(b) identifying misspelled words by checking thereof in the language dictionary and forming a set of correction alternatives for each misspelled word in the phrase;
(c) forming a query of N-grams, followed by a lookup within the N-gram database set stated in step (a) and further search frequency occurrence for each N-gram; the N-gram queries being queried with the parameters which are said misspelled word and said set of correction alternatives, wherein said N-grams contain at least one preceding word and/or at least one succeeding word;
(d) applying a context scoring function to the frequency occurrences found in step (c) for the misspelled word related queries, as well as for each correction alternative for said queries to obtain context scores;
(e) performing a final scoring for the set of correction alternatives stated in step (b) by using context scores obtained in step (d) in a combination with at least one of the following scoring methods:
Editing distance scoring;
Phonetic distance scoring;
POS and grammar scoring;
(f) automatic correction of the misspelled word, or alternatively displaying the list of top candidates to the user to make a correction, the both actions being based upon maximum final scoring of the candidates;

(g) performing the sequence of steps (b) to (f) for each misspelled word;

(h) suspecting that each correctly spelled word is confused one, and forming a set of correction alternatives for each suspected confused word, with further applying the sequence defined in steps (b) to (e) with regard to the suspected confused word (in place of misspelled word), for the sake of verification whether the suspected word is a really confused one, wherein said verification is based upon predefined criteri(on)a.

(i) automatic correction of the confused word, or alternatively displaying the list of top candidates to the user to make a correction, the both actions being based upon maximum final scoring of the candidates.

(j) performing the sequence of steps (g) to (i) until all the suspected confused words are verified and the detected confused words are corrected.

As mentioned above in a preferred embodiment of the invention there is used an N-gram database which is created prior to error checking and correction—step (a) above. N-gram database is a database, each record of which contains two fields: N-gram for each misspelled or confused word and its occurrence frequency. Such database can be created by using web-crawling approaches or by querying the web search engines.

In a mode of the preferred embodiment the N-gram database (where N is an integer from 1 to 10) is created by crawling the web-based documents written in a natural language followed by processing these documents and calculating frequency of occurrence for each unique N-gram. In another mode the N-gram database is created by queering a web-search engine for each unique N-gram and considering the total number of hits as the frequency of occurrence. In a modification of the mode the database is of a compressed-type being effectively compact, but in spite of this, fast searchable. The compression techniques and database layout for fast search are well known in the art.

According to the mode of the preferred embodiment of the invention the creation of the N-gram database by crawling technique is accomplished as follows. First, an initial list of web sites is formed, the web sites being used for:

obtaining therefrom a list of links to other web sites;

downloading text documents therefrom;

The downloaded documents are examined to satisfy certain acceptance rules according to which the found documents can be accepted or rejected for the purpose of creating the database. The documents which do not satisfy these rules are rejected and, therefore, they are not taken into account when creating the database. Examples of such rules are grammar of the target language, predefined list of web domains, predefined formats of documents, filtering considerations (a content having limited access for children, professional filtering, chat slang, etc). Other rules are also can be used. For example, if an N-gram database is created for correcting US—texts (that is, American English is a target language), the documents found on US web-sites are accepted, whereas the documents extracted from e.g. the UK web-sites are rejected (The UK English here is a foreign language).

After that, the set of links obtained from the downloaded documents, as well as obtained from the web-sites, is used for further web-crawling of new documents. Further, the downloaded text documents satisfying the acceptance rules are parsed to extract N-gram information.

N-gram information with frequency occurrences can be obtained by direct processing of WWW-documents. However, in the method of the present invention, preferably, the text parsing techniques which process the downloaded documents are employed. Such techniques are more fast and reliable compared to those based on the processing of WWW-documents.

Yet further, a non-textual information, such as pictures, drawings, etc is removed from these documents. The misspelled words are removed as well. Misspelled words can be detected with the aid of spell checkers known in the art, e.g., MS-Word. On this step the texts written in foreign languages must not be taken into account. The reason for this is that foreign-language-texts usually decrease the quality of spelling. For example, the words COMPRESSOR and KOMPRESSOR have different spellings in English and in German. Since our purpose is to create an N-gram for the target language, the documents and N-grams written in foreign languages are rejected. Any known method for detecting a foreign language text, or a poorly spelled text can be used. Relatively high percentage of misspelled words is an evidence of the text of foreign language. Besides, parts of the texts written, although, in the target language, but with a high percentage of misspelled words, are removed as well.

Finally, parsing the collected texts and counting all N-grams (where N is an integer 1 to 10) is carried out.

Step (b) of the method of the invention comprises identifying misspelled words by checking thereof in the language dictionary and a user personal dictionary and forming a set of correction alternatives for each misspelled word in the phrase.

In a mode of the preferred embodiment correction alternative is considered as a word from the dictionary within a certain configurable "editing distance" from the word-in-question. In another mode correction alternative is generated as a word similarly pronounced to the word-in-question and being within a certain "phonetic distance" from the word-in-question. In a yet another mode correction alternatives are generated using the wild-card search in the N-grams database (where $N \geq 2$), and looking for the N-grams, similar to those for word-in-question, but instead of the word-in-question appears a possible correction alternative. Preferably, in the method of the invention correction alternatives are selected from the most popular N-grams to ensure high probability of occurrence frequency for N-grams of the alternatives.

Practically, alternatives for a word-in-question could be generated by one of the following methods, or any combination thereof:

Introducing editing changes in the words-in-question without a pre-defined editing distance, where the candidates with editing distances 1 and 2 are the must and with editing distances 3, 4, 5 and 6 are optional, and selected from the edited words the candidates, that appear in the dictionary of this language;

Introducing editing changes in the words-in-question by trying phonetically close candidates using well known for the language phonetic rules and selecting from the edited words the alternatives that appear in the dictionary of this language.

Translating the words-in-question to its phonetic presentation (e.g. by using an open-source tool Aspen), generating all possible real-words based on the phonetic presentation and selecting the alternatives that appear in the dictionary of this language.

Making lookup in the N-grams database with a "wildcard" N-gram formed by taking the neighboring words of the word-in-question, which are not misspelled and the wildcard being the word-in-question, and collecting the words as the wildcard substitution.

On step (c) of the method of the invention a query of N-grams is formed, then a lookup within the N-gram database stated in step 0 is carried out, and finally, a frequency occurrence for each N-gram is searched.

In a mode of the method a query of N-grams string comprises a word-in-question or its alternatives and at least one preceding word and/or at least one succeeding word in a phrase. In another mode of the method the N-grams are formed without including the misspelled preceding or succeeding words.

If the N-gram database has been originally created by incorporating not only words, but also punctuation symbols, the N-grams formed for queries may include the punctuation symbols. In a modification of the method a single type of N-grams such as 3-grams or 4-grams is used. In another, preferable, modification at least two types of N-grams each selected from 2-grams, 3-grams, 4-grams and, optionally with greater N-number are used with regards to each word-in-question and its alternatives. The frequency occurrences obtained from the querying N-gram database at this step are used for scoring at the next step (d).

On step (d) of the method of the invention the N-gram occurrence frequencies obtained at the step above are scored to calculate the context score. Any context scoring technique can be applied, for example a technique calculating average, maximum or minimum score for each type on N-grams (2-grams, 3-grams, 4-grams etc.) with subsequent polynomial scoring of the average or maximum value respectively to get the so-called "total context score" for each word-in-question or alternatives (see Example 1 for detailed description).

The next step—(e)—is a final scoring for the set of correction alternatives stated in step (b) by using context scores obtained in step (d). This can be done in a by anyone of the following scoring methods, or any combination thereof:

Editing distance scoring;
Phonetic distance scoring;
POS and grammar scoring;

A final score for the word-in-question and correction alternatives can be calculated as one of the following: weighted context score, editing distance score, phonetic distance score or POS/grammar score, as well as combining thereof with the aid of polynomial function (see Example 1 for detailed description).

On step (f) the spelling correction alternatives are sorted in the descending order of the final score. In a mode of the method the list of alternatives is limited to a pre-defined number of spelling candidates and displayed to the user for making a decision which candidate is to replace the misspelled word. In another mode, the user can see all the correction candidates for misspelled words, as well as for confused ones, when the candidates for replacing the confused words are already offered—step (j) above. In a yet another mode the top candidate replaces automatically the misspelled or confused word (without user's intervention).

Further the misspelled words are corrected one by one in the language direction by applying for each misspelled word the steps (b) to (f). Preferable order of correction is that in which firstly all the misspelled words in the phrase are corrected, and afterwards the correction of confused words is carried out. The reason for such order is, that it is hardly possible to correct confused words in a phrase with spelling mistakes, since the N-grams with misspelled words may not occur in N-grams database, or have rather low frequency occurrence.

Yet further—step (h)—confused words are detected, using the technique similar to that used for misspelled words. The main difference is that unlike the misspelled words, which are detected by not being in a language and/or user personal dictionary, the confused words have to be detected by comparing them with alternatives. In a preferred mode of the method on this step all real words are suspected of being confused. When an alternative brings a much stronger context to the N-grams of the suspected confused words, there is a real case to consider a suspected confused as a "detected" confused word. When such improvement of the context scoring is above a reasonable threshold or when alternatives possess high N-value N-grams (N is 4 and greater) in the N-gram database, whereas the suspected confused word is not, the suspected word is declared as being detected confused.

Steps (i) and (j) for the confused word are similar to the steps (f) and (g), respectively, for the misspelled one.

A modification of the method of the invention is intended to enrich the context of the checked phrase rather than to correct the confused words therein. For example, when the tested word is "purchase" and the context string of the phrase is "I want to purchase some food", it is compared with a string "I want to buy some food". The word "buy" will serve as a valid correction alternative to replace the word "purchase", and is recommended, because of a higher frequency of occurrences.

Spelling correction method of the invention is illustrated by the following examples, which do not limit the scope of the invention.

EXAMPLE 1

The Following Phrase is to be Checked and Corrected (Target Language is US English)

"Unforhently not all ma kids like skull"
Here, the word "Unforhently" is a misspelled form of the correct word "Unfortunately", whereas words "ma" (in place of correct word "my") and "skull" (in place of correct word "school") are out of context of the sentence.

In the present example a calculation of editing distances (Ed-D) was performed with the Levinstein approach [5], however any other method of editing distance calculation may be also used. Phonetic presentation of each word of the phrase was obtained using Aspell program (by running for English-US $aspell -lang=en soundslike) inputting the words of the phrase and outputting their phonetic presentation. The phonetic distances were calculated as Levinstein editing distances [5] between the phonetic presentations, however any other method of phonetic distance estimation, such as Soundex (U.S. Pat. Nos. 1,261,167 and 1,435,663), Metaphone [6], etc may be also appropriate. POS tagging for the N-grams used in the examples can be done using a general knowledge of Parts of Speech (POS) in English. In the present example this has been done by a computer software, implementing a modification of a Hidden Markov model by using a trained on some large enough corpus Viterbi algorithm.

Spelling alternatives for correcting the word "Unforhently" obtained by its editing, phonetic changes therein and combinations thereof are as follows: Unfriendly (ed -3), Unfortunately (ed -4), Innocently (ed -4), Indolently (ed -4), Inherently (ed -5). In the present example a limited set of correction alternatives is shown to demonstrate the scoring of the set members. Usually the method of the invention offers 50 to 100 correction alternatives for each word.

It is possible to use in place of Levinstein editing distances an N-gram frequency occurrence in the WWW—located documents. Since N-gram frequency occurrence in an N-gram database built on a sufficiently large set of Internet located documents is proportional to the number of occurrences of the N-grams in the Internet search engine results, these results will be used hereunder for the detailed explanations of the N-gram-based context scoring.

The number of hits with the search engine $www.yahoo.com has been found for the 3-gram "Unfortunately not all" to be 451 mln, and for the same 3-gram, whereas the first word was taken "Unfriendly"-14,7 mln, "Innocently"-7,9 mln, "Indolently"-0.16mln, and "Inherently-135mln. Note, that the absolute numbers of bits can be quite different at date of your search, but relative number of occurrences for each correction alternative does not change essentially (relative context scoring is calculated as a number of hits for an alternative word divided by the sum of the hits for all alternatives). Similar proportions of bits numbers for the spelling alternatives can be seen also for the bi-grams, such as "Unfortunately not", etc.

POS-analysis and grammar rules, which determine the probability of any part of speech to be followed by another do not consider the candidate words as a forbidden in the limited context of the first sentence 3-gram, therefore all these spelling correction alternatives are accepted.

TABLE 1

Scoring of Spelling Correction Alternatives for a Misspelled Word "Unforhentry"

| Spelling Correction Alternatives For "Unforhentry" | Editing Distance, Absolute/ Normalized Score Ed-D | N-Grams Context Occurrences, mln./ Normalized Score Ctx-D | Phonetic Distance Ph-D, comparing to *NFHNTR Absolute and Normalized Score, Ph-D | Summary scoring: 0.25* Ed-D + 0.5* Ctx-D + 0.25* Pd-D |
|---|---|---|---|---|
| Unfriendly | 3.0/1.0 | 14.7/0.024 | *NFRNTL - 2 – 1.0 | 0.512 |
| Unfortunately | 4.0/0.6 | 451/0.741 | *NFTNTL - 2 – 1.0 | 0.8705 |
| Inherently | 4.5**/0.4 | 135/0.221 | *NHRNTL - 3 – 0.5 | 0.336 |
| Innocently | 4.5**/0.4 | 7.9/0.013 | *NSNTL - 4*** – 0.0 | 0.107 |
| Indolently | 5.5**/0.0 | 0.16/0.001 | *NTLNTL - 3 – 0.5 | 0.125 |

**The score is decreased by 0.5 due to a change in the first letter (from U → I).
***The score is taken as the Levinstein editing distance decreased by 1 due to the difference in the length of phonetic presentations for the word-in-question and the alternative.

In Example 1 the misspelled words were identified by their absence in the language dictionary. Unlike this, the confused words are real words of the language, therefore their identification requires comparison with the alternatives, scoring of the suspected confused words versus possible alternatives and offering the alternatives to user, if the context strength, measured using N-gram approach, is much greater for alternatives, compared to that for the checked real word.

In a mode of the method a recognition of a potential confused word, is carried out using techniques of N-gram analysis with identification of the words having a rather low scoring within N-grams, optionally combined with POS and grammar analyses.

More specifically, each real word of the phrase, which is not misspelled, is suspected to be confused. The hereunder Example 2, which does not limit the scope of the invented method, is intended to illustrate this technique.

EXAMPLE 2

Generation of Correction Alternatives for Confused Word

As an example the word "ma" in the context of the phrase of Example 1 is taken for illustrating the recognition technique.

The set of correction alternatives for the word "ma" obtained by its editing, phonetic changes and their combinations counts about 50 candidates (usually the exemplified technique results in 50 to 100 candidates). For the purpose of illustration in the present example a limited number of candidates is taken, namely "me", "am", "my", "map", mad" and "mom's".

According to said technique the N-grams taken for the analysis do not include the identified misspelled words (in our example, "Unforhentry") and do include:

three 4-grams: "not all ma kids", "all ma kids like", "ma kids like skull";

three 3-grams: "not all ma", "all ma kids", "ma kids like";

two 2-grams: "all ma" and "ma kids".

Number of the total summary hits found by search engine is calculated using the following linear function:

Total hits=k2*(2-gram-hits-sum)+k3*(3-gram-hits-sum)+k4*(4-gram-hits), where, the following values of the coefficients have been chosen: k2=0.01, k3=1.0, k4=100000.0. These values are chosen for the sake of exemplification, and do not limit the scope of the method of the present invention.

TABLE 2

N-grams Total Occurrences

| Word | 2-grams hits, Thousands | 3-grams hits, Thousands | 4-grams hits, | Total Summary Hits, Thousands | Relative Normalized Score |
|---|---|---|---|---|---|
| ma | 1200, 6 Av: 603 | 3, 0, 0 Av: 1 | 0, 0, 0, 0 Av: 0 | 7 | 0.001 |
| me | 3000, 700 Av: 1850 | 134, 0, 0 Av: 45 | 0, 0, 0, 0 Av: 0 | 63.5 | 0.01 |
| my | 340000, 59400 Av: 199700 | 2290, 1530, 145 Av: 1321 | 0, 58, 56, 0 Av: 28 | 6118 | 0.983 |
| map | 1000, 70 Av: 535 | 9, 0, 0 Av: 3 | 0, 0, 0, 0 Av: 0 | 8.4 | 0.001 |
| mad | 1800, 160 Av: 980 | 30, 0, 0 Av: 10 | 0, 0, 0, 0 Av: 0 | 19.8 | 0.002 |

TABLE 2-continued

N-grams Total Occurrences

| Word | 2-grams hits, Thousands | 3-grams hits, Thousands | 4-grams hits, | Total Summary Hits, Thousands | Relative Normalized Score |
|---|---|---|---|---|---|
| am | 1300, 120 Av: 710 | 0.3, 0, 0 Av: 0.1 | 0, 0, 0, 0 Av: 0 | 7.2 | 0.001 |
| mom | 160, 170 Av: 165 | 0, 0, 0 Av: 0 | 0, 0, 0, 0 Av: 0 | 1.7 | 0.0003 |

In mode of the present invention, if the context of N-grams (measured as a Total Summary hits number) of confused alternative is several times stronger than that of a suspected out-of-context word, such word is considered as confused one, and its correction alternatives will be either presented to the user, or automatically correcting (according to the appropriate pre-setting).

candidate is generated by using lookup in N-grams database and seeking for wildcards like "my kids like *" and "kids like *". This method of candidate generation offers several words for consideration, where the word "cool" is of interest due to its editing and phonetic distance proximity to "skull". For N-grams context analysis for "skull" here we used 4-gram "my kids like skull" and its substitutions for N-grams.

TABLE 3

Scoring of Correction Alternatives for "skull"

| Correction Alternatives | Editing Distance, Absolute/ Normalized Score Ed-D | N-Grams Context Occurrences/ Normalized Score Ctx-D | Phonetic Distance Ph-D, comparing to *NFHNTR Absolute and Normalized Score Ph-D | Summary scoring: 0.25* Ed-D + 0.5* Ctx-D + 0.25* Pd-D |
|---|---|---|---|---|
| skull | 0.0/1.0 | 0/0.000 | SKL - 0 – 1.0 | 0.5 |
| school | 5.0/0.0 | 74/0.913 | SKL - 0 – 1.0 | 0.685 |
| cool | 2.5**/0.5 | 7/0.086 | KL - 0 – 0.0 | 0.272 |

**Score has been decreased by 0.5 due to a change in the first letter (from s → c)

Yet another criterion for detecting a suspected word as confused one is as follows. If queries with the suspected word do not result in any 4-grams in N-grams database (that means a zero frequency of occurrence), whereas the queries with the alternative word do find 4-grams with non-zero frequency of occurrence, then the word is considered as confused.

In Example 2, we take a threshold-value of 10. Since the Total Summary Hits for "my" is 6118 and for "ma" is 7, the ratio is 6118/7=874>10. According to the acceptance by the both confused word detection criteria, the word "ma" is confused within the context of its phrase.

Looking at the word "my" within the nearest context of "my kids" and "all my kids", the word "my" meets the acceptance criteria of POS-analysis and grammar rules. Some other correction alternatives, such as "am" and "me" are filtered by POS and grammar, since "all am kinds" and "all me kids" do have serious POS and grammar issues.

When a confused word is identified, various policies may be applied towards presentation of the confused words candidates. One of them is presenting to the user only those alternatives that meet the acceptance criteria, POS and grammar. Yet another policy is presenting to the user all the alternatives. When several alternatives meet all the required criteria, the presentation order of alternatives in the correction candidates list will be descending with the Relative Normalized Score, such as calculated in Table 1.

In the above-mentioned example the correction of the confused word "skull" is carried out similar to correction of the confused word "ma". A phonetically same candidate "school" has a rather large editing distance (Ed-D is 5), but exactly the same phonetic presentation, namely SKL, and very high hits number for its N-grams "like school", "kids like school" and "my kids like school". Competitive alternative The alternatives "school" and "cool" meet the both criteria (although one is enough) with ratio of hits above 10 than for the word "skull" and have 4-gram hits, where the word "skull" has zero hits. Moreover, "kids like school" and "kids like cool" are accepted by POS-tagging and grammar analysis. Therefore, the words are declared as confused, and are presented to users of interactive spellers, where "school" with a higher Summary Score (0.685) will be positioned as the first alternative and "cool" with a lower score (0.272) will be the second alternative.

If this approach is used for automatic correction system, the confused word "skull" is automatically corrected to its alternative, meeting at least one of the acceptance criteria and scored highest at the Summary Score.

Example 3. Comparison of the speller checkers known in the art and a spelling system using a method of the present invention referred hereunder as Ghotit ($www.ghotit.com).

The exemplified phrases (a) to (h) are from the Ph.D. theses of Jeniffer Pedler ($http://www.dcs.bbkac.uk/research/recentphds/pedler.pdf).

The exemplified phrase (i) is from Wikipedia example ($http://en.wikipedia.org/wikilSpell_checker).

The exemplified phrase G) is from SpeEdChange Blog. ($http://speedchange.blogspot.com/2008/02/ghotit.htrnl)

(a) There seams to be some confusetion.
   Total Spelling Errors—2
   MS-Word-2003 fixed—0
   MS-Word-2007 fixed—1, seams->seems
   Ghotit fixed—2

(b) I fund out thaty I have a half sister how I know little abouy except that she has two children and like out doo activtes.

Total Spelling Errors—6
MS-Word-2003 fixed—3, thaty→that, abouy→about, childern→children
MS-Word-2007 fixed—4, fund→>found/find, thaty→that, abouy→about, childern→children
Ghotit fixed—6

(c) I still dint kow wat was worng with me. No one reelly new how bad my writig was.
Total Spelling Errors—7
MS-Word-2003 fixed—4, kow→know, worng→wrong, reelly→really, writig→writing
MS-Word-2007 fixed—4, kow→know, worng→wrong, reelly→really, writig→writing
Ghotit fixed—7

(d) Wether the wether be fine.
Total Spelling Errors—2
MS-Word-2003 fixed—2
MS-Word-2007 fixed—2
Ghotit fixed—2

(e) I think I did well becoser I got of to a good stare and I have almost finsder my booklet and I have done a fuwe peturs on the computer and now I am doing a couver.
Total Spelling Errors—7
MS-Word-2003 fixed—3, becoser→because, fuwe→few, couver→cover
MS-Word-2007 fixed—4, becoser→because, of→off, fuwe→few, couver→cover
Ghotit fixed 6, becoser→because, of→off, stare→start, finsder→finished, fuwe→couver→cover (f) Its latter prefect awl the weigh.
Total Spelling Errors—5
MS-Word-2007 fixed—0
MS-Word-2007 fixed—1, awl→all
Ghotit fixed—3, latter→letter, prefect→perfect, weigh→way (g) Its plane fore al too sea.
Total Spelling Errors—5
MS-Word-2003 fixed—0
MS-Word-2007 fixed—1, fore→for
Ghotit fixed—5

(h) The cat scillfully creps up behind a sack and all of a suden his musirls are tens he spring and a little squick from themouse I herd as the cats clors sunck deep into the mouse the cat quilly ete it and then cerled up on a sack to slip.
Total Spelling Errors—14
MS-Word-2003 fixed—9, skillfully→skillfully, creps→creeps, suden→sudden, squick→squeak, themouse→the mouse, herd→heard, snuck→sunk, ete->ate, cerled→curled
MS-Word-2007 fixed—9, willfully→skillfully, creps→creeps, suden→sudden, squick→squeak, themouse→the mouse, herd→heard, sunck→sunk, ete->ate, cerled→curled
Ghotit fixed 13, except slip (follow HOW TO USE instructions)

(i) Their coming too sea if its reel.
Total Spelling Errors—5
MS-Word-2003 fixed—0
MS-Word-2007 fixed—0
Ghotit fixed—5 (follow HOW TO USE instructions)

(j) Awnly onse I sod axin him fer kawfee.
Total Spelling Errors—6
MS-Word-2003 fixed—2, onse→once, fer→for
MS-Word-2007 fixed—2, onse→once, fer→for
Ghotit fixed—6

Summary for Phrases (a) to (j):

| Total Spelling Errors | 59 | 100% |
|---|---|---|
| MS-Word-2003 fixed | 21 | 35.6% |
| MS-Word-2007 fixed | 26 | 44.1% |
| Ghotit fixed | 55 | 93.0% |

In yet another preferred embodiment the invention provides a computer system, employing the method and co-hosted at the same computer with the applications, like word-processors mails, etc, that are using the system. Said system comprises a spelling application, a persistent storage device for keeping the N-grams database, used by the spelling application. Non-limiting examples of such device are a hard disk, a flash disk, or an external persistent storage, such as USB flash, external disk, etc. The device also mounts a language dictionary, a checker of misspelled words, and other software employing the method of the present invention. Most frequently used N-grams may reside permanently in memory, where yet another optimization option could be usage of N-grams in-memory database.

Yet other preferred embodiments are using N-grams database, located at a network server/s; the database can reside on a persistent internal or external storage of the server. In some modes, the database operates as in-memory database to provide faster processing of the queries. In different modes of the invention network server's may be located either in LAN, WAN or in the Internet, or can be also a web-server/s. In some embodiment when the N-gram database is located at a persistent storage (e.g., hard disk, USB flash memory), the spelling checker software can allocated some of the computer device memory and use it for most frequently used N-grams with their frequencies in order to make the lookup faster. Spelling application located at the network server's is using N-grams database and provides spelling correction services via network. Applications like word processors, e-mails, chats, etc are sending via network queries to the system, and spelling correction application, based at the network server/s, responds to the queries.

BRIEF DESCRIPTION OF THE DRAWINGS

FIG. 1 depicts deployment of the invented system, comprising spelling application 12 and N-grams database 13 and 14, co-hosted at computing device with the applications using the correction system services. Various applications 11, like word processors, editors, etc are getting services from the spelling application 12, which is using N-grams database in-memory 13 and persistent parts to provide correction services.

FIG. 2 depicts deployment of the invented system, comprising spelling application N-grams database, and located at a network servers 21 with a persistent storage, local or a network database of N-grams 22. Various types of computing devices 23, 24, 25 and 26 with different applications like word processors, editors, etc are sending correction queries to the network based invented correction system and are getting corrected responses.

Figure 1:
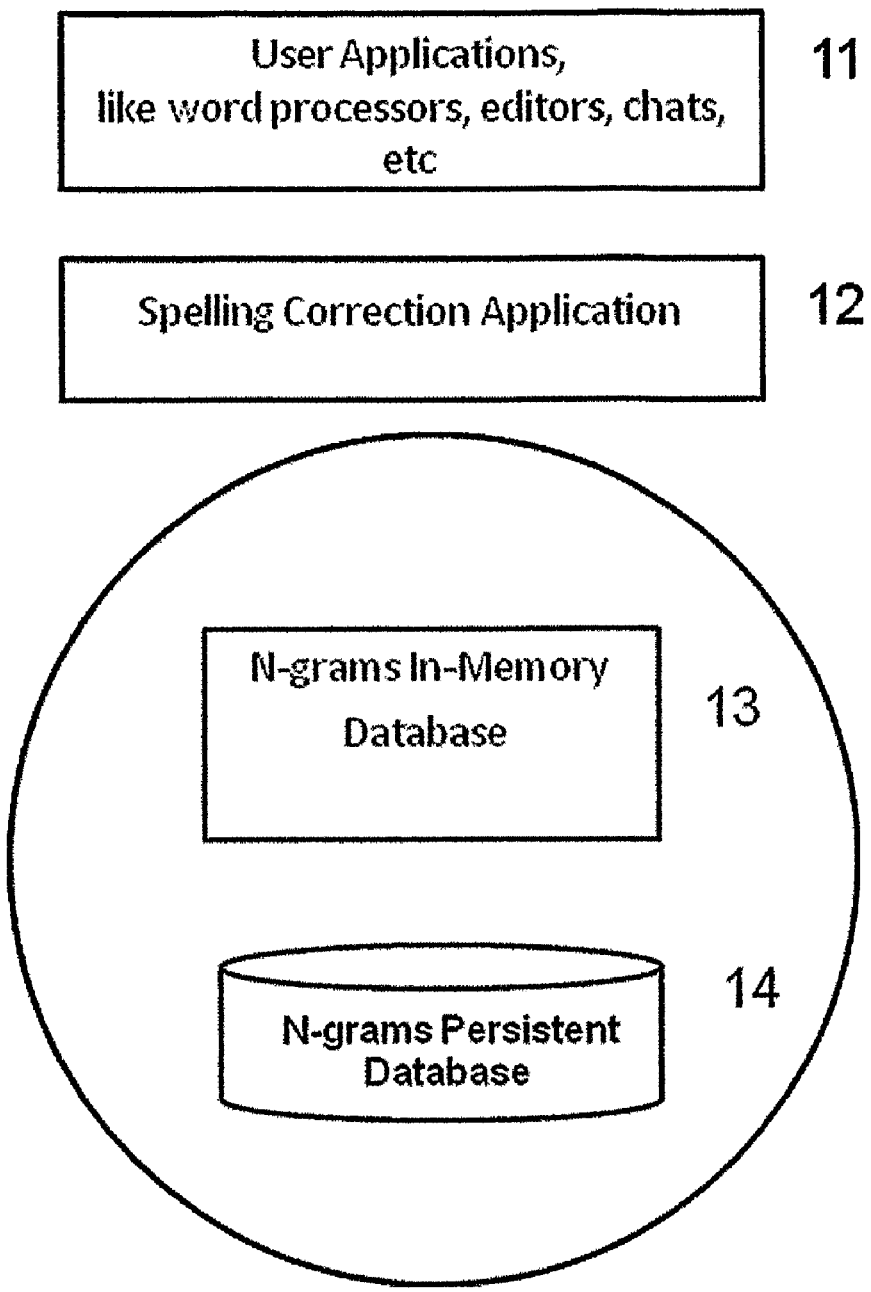
FIG. 1 is a schema describing the text correction system co-hosted at the same computing device with the applications that are using text correction services.
Figure 2:
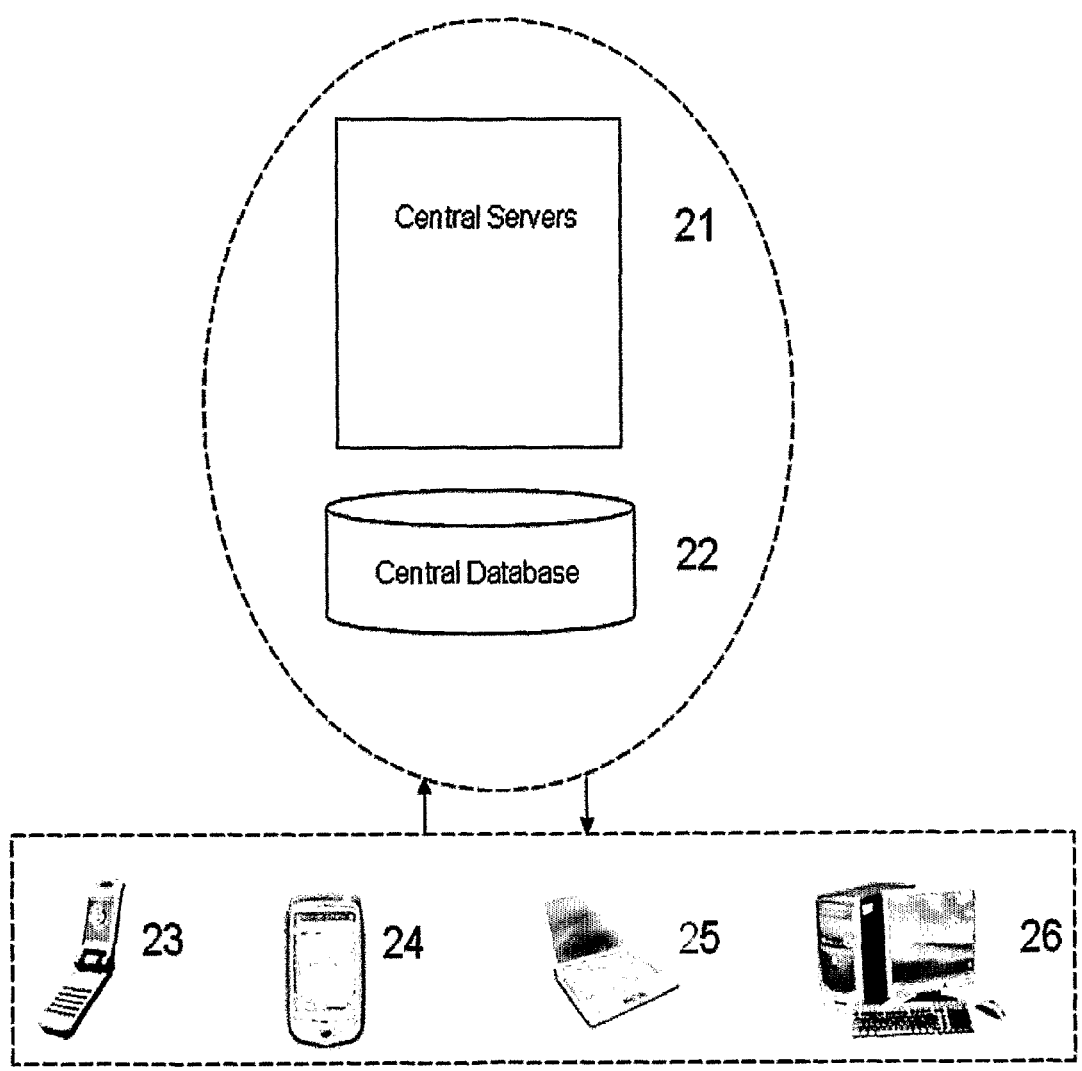
FIG. 2 is a schema describing the text correction system located in the network.

What is claimed is:

1. A method for correcting at least one misspelled word in a phrase written in a natural language, comprising:
   (a) identifying a misspelled word in the phrase by checking the word against words in a dictionary and compiling a set of correction alternatives for each word identified as misspelled in the phrase;
   (b) for each identified word generating a set of N-grams, wherein each N-gram includes a correction alternative for the identified word and one or more other words from the phrase;
   (c) querying a validated N-gram database with substantially each of the generated N-grams to generate a score for substantially each of the generated N-grams, wherein the score of a given generated N-gram is at least partially based on a (relative) frequency of occurrence of the given N-gram in the N-gram database;
   (d) adjusting the score of substantially each N-gram based on a context scoring function;
   (e) calculating a final score for each of the correction alternatives based on a combination of the adjusted score for the correction alternative's associated N-gram and each of: (i) editing distance between the identified word and the correction alternative; (ii) phonetic distance between the identified word and the correction alternative; and (iii) Parts Of Speech and Grammar scoring; and
   (f) automatically suggesting a list of one or more of the misspelled word's correction alternatives, wherein said suggested correction alternatives are the alternatives for which the highest final scores were calculated including relative normalized scores.

2. The method according to claim 1 further comprising automatically correcting the misspelled word to one of its alternatives, at least partially based on the final scores calculated for said alternatives.

3. A method for correcting at least one confused word in a phrase written in a natural language, comprising:
   (a) suspecting a word of being a confused word when it is found in a dictionary;
   (b) creating a set of correction alternatives for the suspected confused word in the phrase, based on a combination of: (i) editing distance between the suspected word and possible correction alternatives; (ii) phonetic distance between the suspected word and possible correction alternatives; and (iii) wildcard, including phonetic, substitutions;
   (c) generating sets of N-grams, for the suspected confused word and for each of one or more of its correction alternatives, wherein each N-gram includes either the correctly spelled word or one of its correction alternatives, and one or more other words from the phrase;
   (d) querying a validated N-gram database with substantially each N-gram of the generated N-gram sets to generate a score for the suspected confused word and one or more of its correction alternatives, wherein the score is at least partially based on the (relative) frequency of occurrence of N-grams from the N-gram set corresponding to the suspected confused word and the frequency of occurrence of N-grams from N-gram sets corresponding to substantially each of the correction alternatives, in the validated N-gram database;
   (e) adjusting the score of substantially each N-gram based on a context scoring function;
   (f) calculating a final score for the suspected confused word and substantially each of the correction alternatives based on a combination of their adjusted scores and each of: (i) editing distance between the identified word and the correction alternative; (ii) phonetic distance between the identified word and the correction alternative; and (iii) Parts Of Speech and Grammar scoring;
   (g) determining if the suspected confused word is indeed a detected confused word based on a comparison of its adjusted score to the adjusted scores of one or more of its correction alternatives; and
   (h) suggesting a list of one or more of the suspected confused word's correction alternatives, wherein said suggested correction alternatives are the alternatives for which the highest final scores were calculated including relative normalized scores.

4. The method according to claim 3 wherein determining if the suspected confused word is indeed a detected confused word is at least partially based on a combination of both the adjusted and the final scores of said suspected confused word and one or more of its correction alternatives.

5. The method according to claim 3 further comprising automatically correcting the detected confused word to one of its correction alternatives, wherein the correction to a specific correction alternative is at least partially based on the correction alternatives' final scores.

6. The method according to claim 3 further comprising applying one or more Parts Of Speech and Grammar techniques to a suspected confused word prior to creating a set of correction alternatives for it; and eliminating the suspicion of said word being a confused word based on the result of said applied techniques.

7. The method according to claim 3 further comprising determining which of the correction alternatives for the suspected word is correct based on a comparison of a combination of their adjusted and final scores.

8. The method according to claim 3 further comprising setting a threshold for the adjusted and/or final scores of the suspected confused word's alternatives, wherein only when one or more of said alternatives' scores reach or surpass said threshold score, the suspected confused word may be determined to be an actual confused word.

9. The method according to claim 3 further comprising giving the frequency of occurrence of N-grams possessing higher N-values a greater effect on the scores of the correction alternatives than the effect given to equal frequencies of occurrence of N-grams possessing lower N-values.

10. An apparatus for correcting at least one misspelled word in a phrase written in a natural language, comprising:
    (a) a words spell checker functionally associated with a dictionary of the natural language, adapted to identify a misspelled word in the phrase by checking the word against words in the dictionary and compiling a set of correction alternatives for each word identified as misspelled in the phrase;
    (b) an N-gram generator adapted to generate a set of N-grams for each identified word, wherein each N-gram includes a correction alternative for the identified word and one or more other words from the phrase;
    (c) a spelling application adapted to query a validated N-gram database with substantially each of the generated N-grams to generate a score for substantially each of the generated N-grams, wherein the score of a given generated N-gram is at least partially based on a (relative) frequency of occurrence of the given N-gram in the N-gram database, and to adjust the score of substantially each N-gram based on a context scoring function;
    wherein said spelling application is further adapted to calculate a final score for each of the correction alternatives based on a combination of the adjusted score for the correction alternative's associated N-gram and each of:

(i) editing distance between the identified word and the correction alternative, (ii) phonetic distance between the identified word and the correction alternative; and (iii) Parts Of Speech Grammar scoring; and wherein said spelling application is further adapted to automatically suggest a list of one or more of the misspelled word's correction alternatives, wherein said suggested correction alternatives are the alternatives for which the highest final scores were calculated including relative normalized scores.

11. The apparatus according to claim 10 wherein the spelling application is further adapted to automatically correct the misspelled word to one of its alternatives, at least partially based on the final scores calculated for said alternatives.

12. An apparatus for correcting at least one confused word in a phrase written in a natural language, comprising:
 (a) a words spell checker, functionally associated with a language dictionary of the natural language, adapted to suspect a word in the phrase as a potentially confused word when it is found in said language dictionary;
 (b) a spelling application adapted to create a set of correction alternatives for one or more suspected confused words in the phrase, based on a combination of: (i) editing distance between the suspected confused word and possible correction alternatives; (ii) phonetic distance between the suspected confused word and possible correction alternatives; and (iii) wildcard, including phonetic, substitutions;
 (c) an N-gram generator adapted to generate sets of N-grams, for the suspected confused word and for each of one or more of its correction alternatives, wherein each N-gram includes either the suspected confused word or one of its correction alternatives, and one or more other words from the phrase; and
 wherein said spelling application is further adapted to:
 (d) query a validated N-gram database with substantially each of the generated N-gram sets to generate a score for the suspected confused word and for one or more of its correction alternatives, wherein the score is at least partially based on a (relative) frequency of occurrence of N-grams from the given N-gram set corresponding to the suspected confused word, and the frequency of occurrence of N-grams from sets corresponding to substantially each of the correction alternatives, in the N-gram database;
 (e) adjust the score of substantially each N-gram based on a context scoring function;
 (f) calculate a final score for the suspected confused word and substantially each of the correction alternatives based on a combination of their adjusted scores and each of: (i) editing distance between the identified word and the correction alternative; (ii) phonetic distance between the identified word and the correction alternative; and (iii) Parts Of Speech and Grammar scoring;
 (g) determine if the suspected confused word is indeed a detected confused word based on a comparison of its adjusted score to the adjusted scores of one or more of its correction alternatives and
 (h) automatically suggest a list of one or more of the suspected confused word's correction alternatives, wherein said suggested correction alternatives are the alternatives for which the highest final scores were calculated including relative normalized scores.

13. The apparatus according to claim 12 wherein the spelling application is further adapted to determine if the suspected confused word is indeed a detected confused word at least partially based on a combination of both the adjusted and the final scores of said suspected confused word and one or more of its correction alternatives.

14. The apparatus according to claim 12 wherein the spelling application is further adapted to automatically correct the detected confused word to one of its alternatives, wherein the correction to a specific correction alternative is at least partially based on the correction alternatives' final scores.

15. The apparatus according to claim 12 wherein the spelling application is further adapted to give the frequency of occurrence of N-grams possessing higher N-values a greater effect on the scores of the correction alternatives than the effect given to equal frequencies of occurrence of N-grams possessing lower N-values.

16. The apparatus according to claim 12 wherein the spelling application is further adapted to determine which of the correction alternatives for the suspected word is correct based on a comparison of their scores.

* * * * *